US006396651B1

(12) United States Patent
Grover

(10) Patent No.: US 6,396,651 B1
(45) Date of Patent: May 28, 2002

(54) GEAR-SHIFTING COMPENSATION SYSTEM AND METHOD FOR NONLINEAR INPUT ELEMENTS

(76) Inventor: Deanne S. Grover, 8017 Golden Oak Rd., Addendum 1, OK (US) 73127

( * ) Notice: Subject to any disclaimer, the term of this patent is extended or adjusted under 35 U.S.C. 154(b) by 0 days.

(21) Appl. No.: 09/352,177

(22) Filed: Jul. 12, 1999

(51) Int. Cl.[7] ............................. G11B 5/035; G11B 5/09
(52) U.S. Cl. .............................. 360/65; 360/46; 360/53
(58) Field of Search ............................. 360/46, 65, 53; G11B 5/035, 5/09

(56) References Cited

U.S. PATENT DOCUMENTS

| 5,418,660 | A | * | 5/1995 | Sato et al. ..................... 360/65 |
| 5,669,133 | A |   | 9/1997 | George |
| 5,744,993 | A |   | 4/1998 | Sonntag |
| 5,754,355 | A |   | 5/1998 | Nakamura et al. |
| 5,898,532 | A | * | 4/1999 | Du et al. ....................... 360/46 |
| 5,943,177 | A | * | 8/1999 | Mathews et al. .............. 360/65 |
| 6,038,090 | A | * | 3/2000 | Freitas ......................... 360/46 |
| 6,141,167 | A | * | 10/2000 | Nishida et al. ................ 360/65 |
| 6,147,828 | A | * | 11/2000 | Bloodworth et al. .......... 360/65 |

FOREIGN PATENT DOCUMENTS

JP          09265603 A  * 10/1997   ............ G11B/5/02

OTHER PUBLICATIONS

Yannis Tsividis, Mihai Banu and John Khoury, "Continuous–Time–MOSFET–C Filters in VLSI," IEEE Transactions on Circuits and Systems, vol. CAS–33, No. 2, Feb. 1986, pp. 125–140.

H. Suyama Et Al, "Thin Film MR Head For High Density Rigid Disk Drive," IEEE Transactions On Magnetics, vol. 24 (No. 6), Nov. 1998, pp. 2612–2616.
J. Sonntag Et Al, "A High Speed, Low Power PRML Read Channel Device," IEEE Transactions on Magnetics, vol. 31 (No. 2), Mar. 1995, pp. 1186–1195.
Yannis Tsividis and Paolo Antognetti, Design of MOS VLSI Circuits For Telecommunications, "Continuous–Time Filters," Chapter 11, pp. 334–371, Prentice Hall, Inc. 1985, Engelwood Cliffs, NJ.
H. Suyama Et Al, "Thin Film MR Head For High Density Rigid Disk Drive," IEEE Transactions On Magnetics, vol. 24 (No. 6), Nov. 1998, pp. 2612–2614.
Patent Abstracts of Japan, Publication No. 07057227, Publication Date Mar. 03, 1995, "Device For Evaluation Quantum Of Non–Linear Distortion Of Reproducing Head".
T. Yamakoshi Et Al, "The Effect Of Non–Linear MR Read––back Distortion On A PRML Channel," IEEE Translation on Magnetics in Japan, vol. 9 (No. 3), May/Jun. 1994.

* cited by examiner

Primary Examiner—David Hudspeth
Assistant Examiner—Dan I. Davidson

(57) ABSTRACT

The present invention comprises devices and methods for recovering a block of data. In a preferred embodiment, a block erroneously read due to improper read head nonlinearity compensation is recovered with only one re-read attempt. For the first portion of the block read, the rate of nonlinearity compensation adaptation is up-shifted to a rate more than twice the nominal rate. Substantially off of the remainder of the block is then read with a down-shifted compensation. Preparatory steps are also provided for simple ranging, iterative ranging, and otherwise deriving a nonlinearity compensation value from stored data and software implemented by a controller.

13 Claims, 8 Drawing Sheets

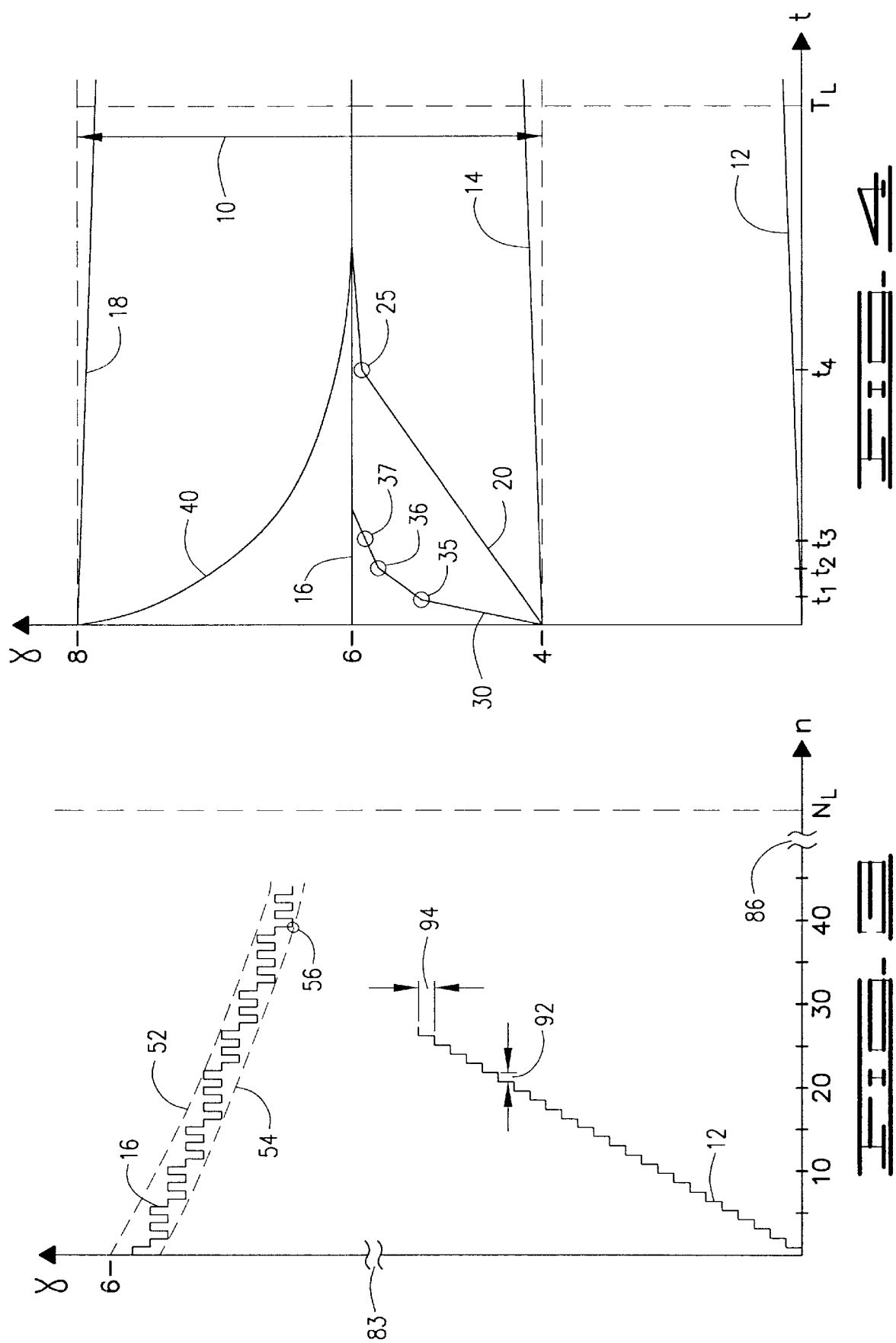

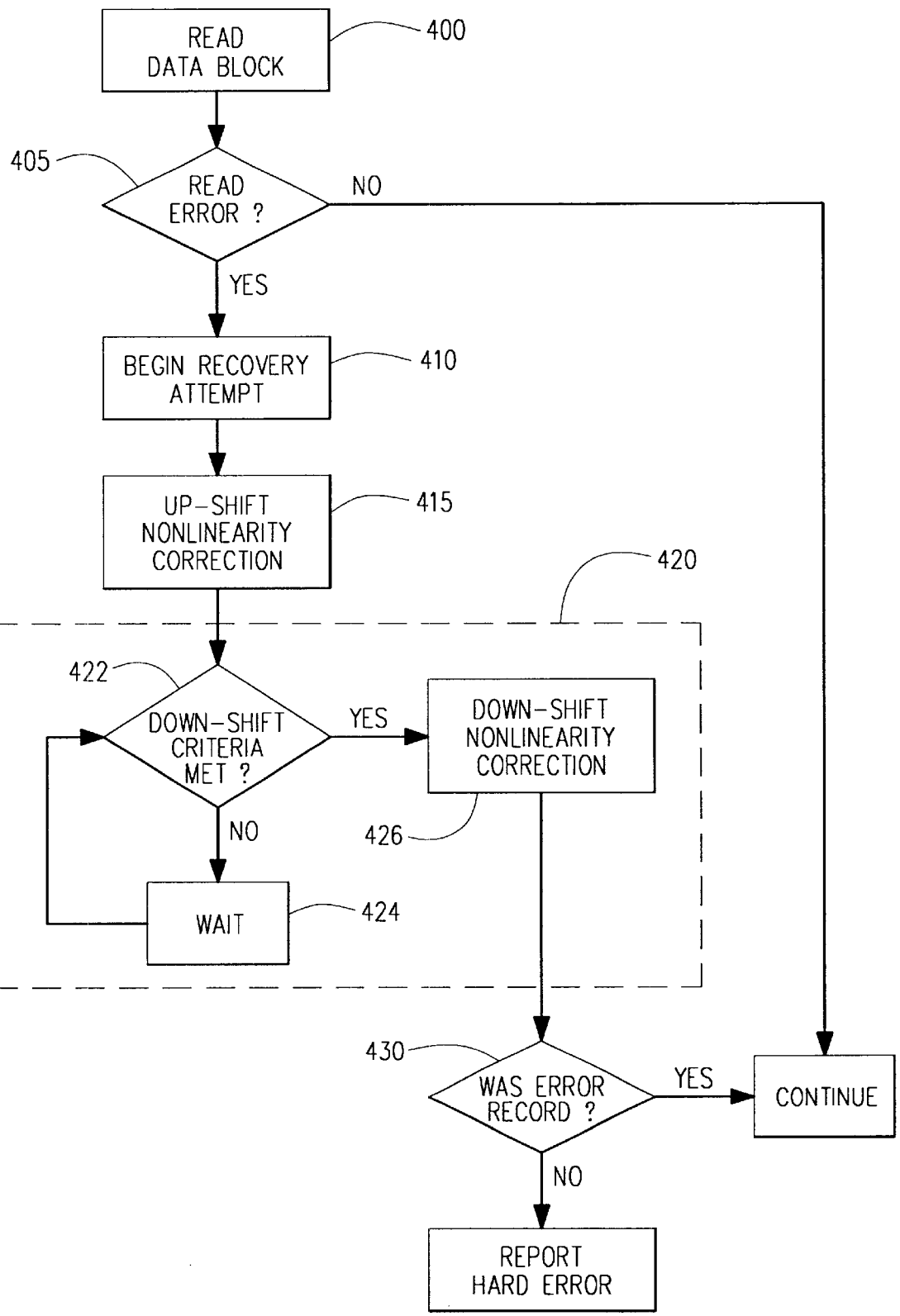
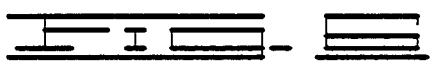

GEAR-SHIFTING COMPENSATION SYSTEM AND METHOD FOR NONLINEAR INPUT ELEMENTS

FIELD OF THE INVENTION

The present invention relates generally to methods and devices that use nonlinear elements to receive data. More particularly, the present invention relates to systems that provide adaptive compensation for such nonlinearity.

BACKGROUND OF THE INVENTION

Data retrieval performance requirements are advancing at a phenomenal rate. Mass storage device capacities grow at an average rate of more than 50% per year. Device access times and power consumption levels are also generally shrinking. Because of these requirements and similar advancements in other fields of technology, the use of higher-performing nonlinear elements has proliferated.

For an integrated circuit (IC) at the read channel output to interpret data from nonlinear elements correctly and at very high data rates, nonlinearity compensation systems have been developed. These systems introduce a signal, synchronized with the read signal, to offset the nonlinearity enough to make the read signal intelligible to the channel IC.

Stringent system requirements have necessitated further improvements in this nonlinearity compensation, however. Magneto-resistive (MR) elements, for example, can change state with temperature changes, electrical fluctuations, asperities, and fractured (i.e. multiple-domain) fields. These state changes can prevent an MR device from reading correctly for significant periods of time. Modern giant magneto-resistive transducers and dual stripe devices are particularly vulnerable to this type of problem.

Some relief is obtained from adaptive nonlinearity adjustment systems such as that depicted in U.S. Pat. No. 5,744, 993 ("Read Channel for at Least Partially Offsetting Nonlinear Signal Effects Associated with the Use of Magneto-Resistive Heads" filed Sep. 27, 1995 by Jeffrey Lee Sonntag). These systems detect a measure of how much nonlinearity is in the signal received by the channel IC, and adjust the compensation to make it lower. Further relief from this problem is obtained by error correction routines. In a 1024-byte block, for example, present-day routines can correct for up to about 32 bytes of erroneous data, without re-reading. Thus, a nonlinear element in an unknown state can afford to mis-read up to about 32 bytes of data at the beginning of a sector before the error becomes non-correctable. Unfortunately, this is often much too short a time in which to compensate for a large state change. Such systems often require many re-read attempts to be successful, or fail entirely.

Existing adaptive nonlinearity compensation schemes are only satisfactory for very slow state changes. They are poorly suited for rapid state changes or for large state changes which can occur when a read element is not used for a substantial period of time. The present invention provides a solution to this and other problems, and offers other advantages over the prior art.

SUMMARY OF THE INVENTION

The present invention comprises devices and methods for recovering a block of stored data that has been erroneously read due to improper read head nonlinearity compensation. Systems of the present invention typically provide compensation sufficient to allow a channel IC to interpret a read signal correctly within about 4% of the block read duration. Thus, the present invention typically prevents such improper compensation from causing large numbers of erroneous bytes to be read. With the present invention, error recovery is usually possible by re-reading the block only once.

In accordance with one embodiment of the invention, an electro-mechanical system is described in which a nominal rate of compensation adjustment is derived according to methods such as are known in the art. A controller then up-shifts the rate of adaptation by more than twice the nominal rate while a read element reads a first portion of the data block. Subsequently, the controller down-shifts the rate of adaptation to a lower rate allowing stable compensation for most of the remaining bytes of the block.

Systems of the present invention optionally provide data stored in a memory device from which the controller derives initial compensation values, routines to down-shift the rate of adaptation in stages or continuously, and simple and iterative ranging.

The present invention also can be implemented as a computer-readable program storage device which tangibly embodies a program of instructions executable by a computer system to perform a gear-shifting adaptive compensation method as described above.

These and various other features as well as advantages which characterize the present invention will be apparent upon reading of the following detailed description and review of the associated drawings.

BRIEF DESCRIPTION OF THE DRAWINGS

FIG. 3 plots nonlinearity compensation signals of the prior art and of the present invention as time-dependent functions. FIG. 3 uses gaps to amplify portions of interest such as a time-varying operability range.

FIG. 4 removes the gaps so that the slow convergence of NC signals of prior art systems to the operability range can be seen. FIG. 4 also depicts NC signals and simple ranging of the current invention.

FIG. 6 depicts a method of the present invention for recovering a block of stored data that has been erroneously read due to improper read head nonlinearity compensation.

DETAILED DESCRIPTION

Figure 1:
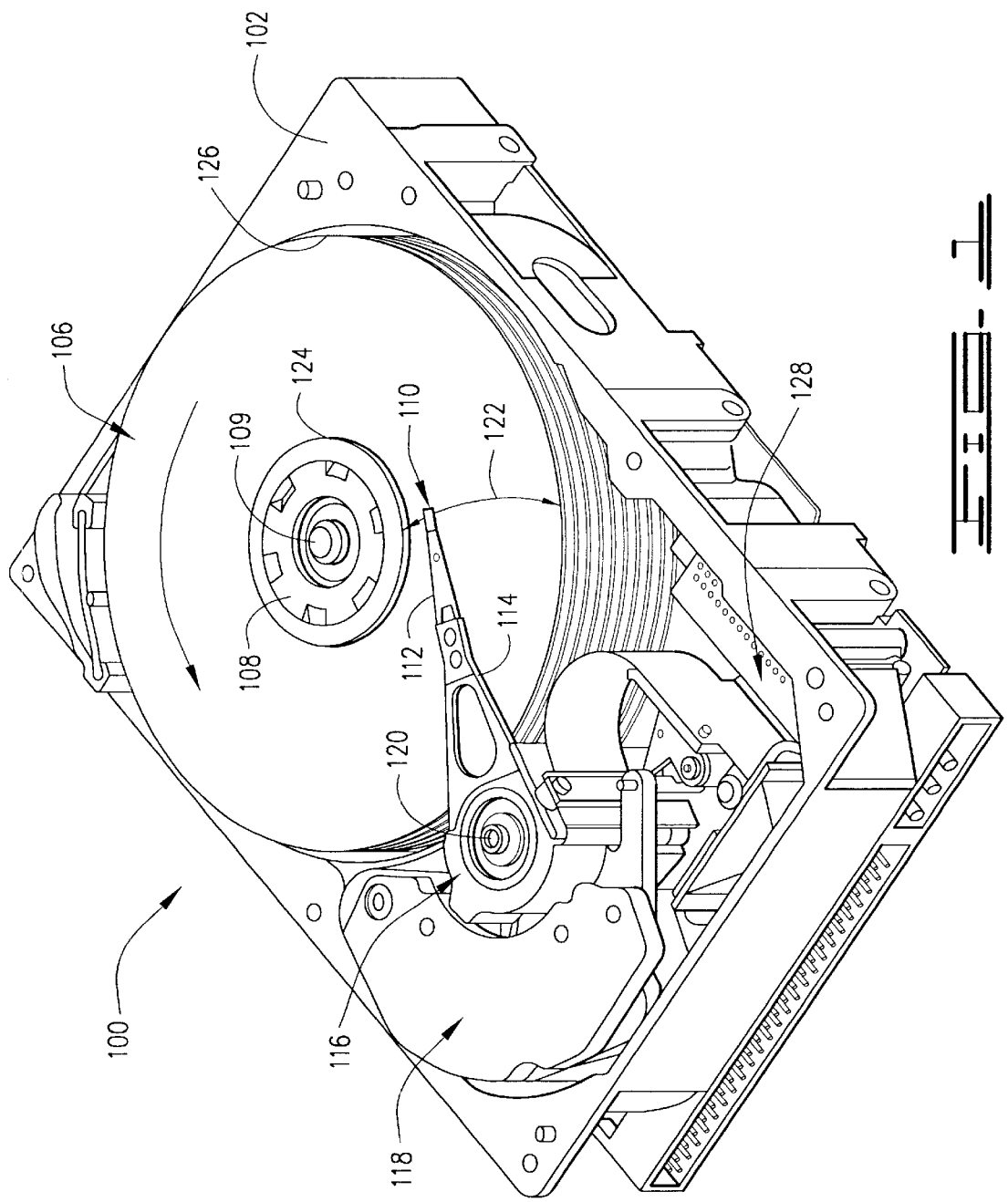
FIG. 1 illustrates a present-day disc drive of a type that can benefit from the present invention.

FIG. 1 is a perspective view of a magnetic disc drive in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs mounted for co-rotation about central axis 109. Each disc surface has an associated head 110, which is mounted to disc drive 100 for communication with the disc surface. In the example shown in FIG. 1, heads 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. VCM 118 rotates actuator 116 with its attached heads 110 over a desired data track along an arcuate path 122 between a disc inner diameter 124 and a disc outer diameter 126. VCM 118 operates under control of internal circuitry 128.

The heads 110 and rotating disc pack 106 form a communication channel which can receive digital data and reproduce the digital data at a later time. Write circuitry within the internal circuitry 128 receives data, typically from a digital computer, and then encodes data in code words (i.e. groups of a fixed number of bits) adapted to the communication channel. The encoded data is then used to modulate a write current provided to write transducer in the head 110. The write transducer in the head 110 causes successive code words to be encoded on a magnetic layer on disc pack 106. At a later time, a read transducer in the head 110 (i.e., the read head) reads the successive code words from the magnetic layer as a serial modulated, nonlinearity-compensated read signal. Read circuitry within internal circuitry 128 demodulates the read signal into successive parallel code words. The demodulated code words are then received by detector circuitry within internal circuitry 128 that recovers the digital data for use, typically by a digital computer, at a later time.

Figure 2:
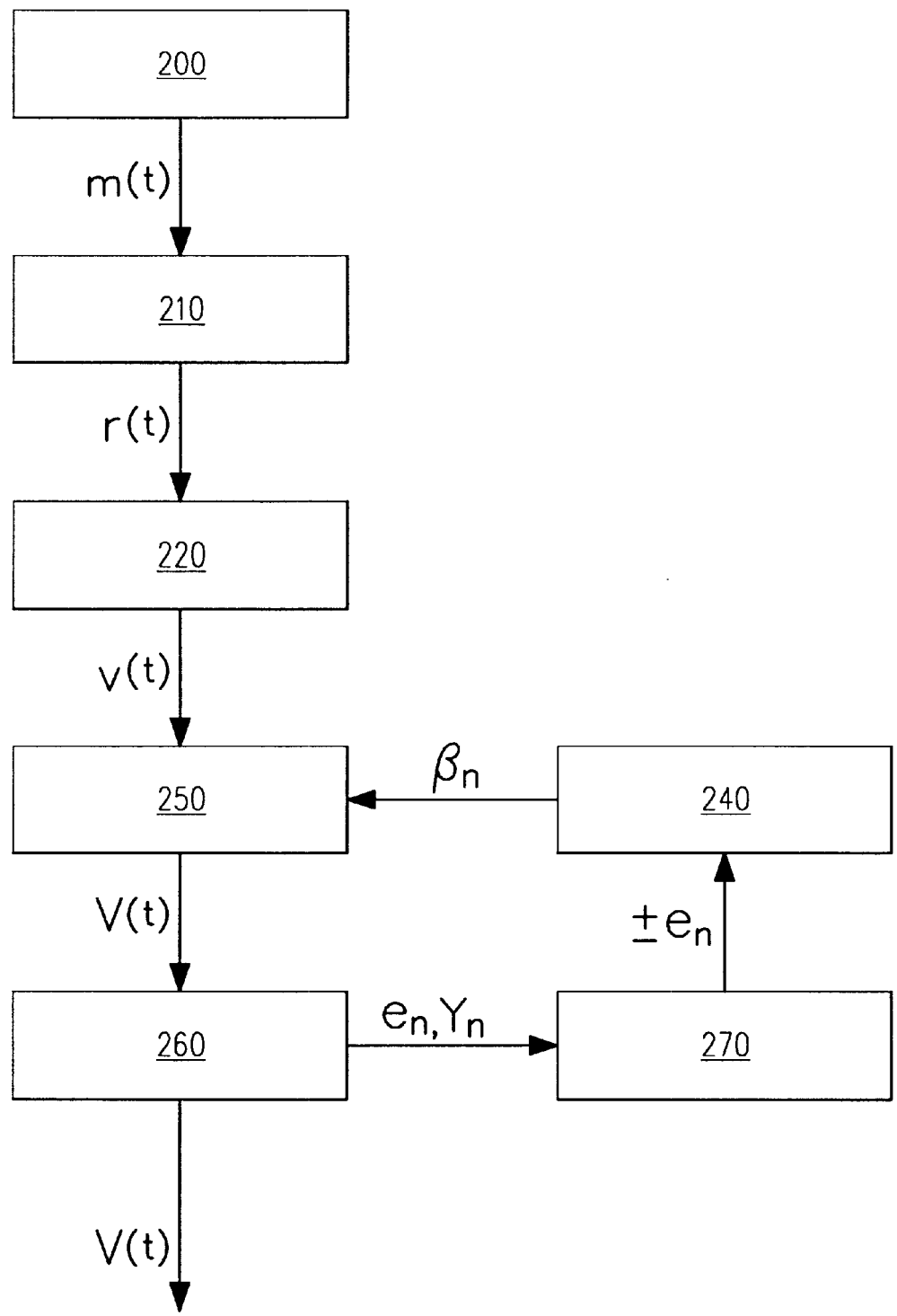
FIG. 2 depicts an adaptive nonlinearity feedback system of the prior art in block diagram form.

FIG. 2 depicts an adaptive nonlinearity feedback system of the prior art. MR head 210 senses magnetic field signal m(t) from disc 200 as a resistance signal r(t). Numerous head designs and biasing schemes are known in the art, as exemplified in U.S. Pat. No. 5,669,133. Preamplifier 220 amplifies the resistance signal r(t) to generate amplified signal v(t). Modulator 250 reduces the second order component of amplified signal v(t) according to the value of second-order multiplier $\beta_n$ to produce (partially) compensated signal V(t) as depicted in U.S. Pat. No. 5,744,993. Under suitable conditions, compensated signal V(t) is intelligible to channel IC 260, which can then generate digitized system output $D_n$. Additionally, channel IC 260 provides error magnitude $e_n$ and sign information $Y_n$ to feedback circuit 270, which then provides the increment $\pm e_n$ by which integrator 240 adjusts the second-order multiplier $\beta_n$.

Nonlinearity feedback systems, even adaptive ones such as depicted in FIG. 2, are often too slow in making a partially compensated signal intelligible to a channel IC. System stability often requires that feedback fluctuations be kept small, which can result in slow system responses for a read head in an unexpected or uncharacterized state.

FIG. 3 illustrates nonlinearity compensation (NC) signals plotted as a single value γ against discrete time variable n. Discrete time variable n represents clock cycles (i.e. bit read events) for simplicity, although γ recalculate events in an actual system typically occur every 5–50 clock cycles. Gaps 83 and 86 in the vertical and horizontal axes allow better magnification of the areas of interest. NC signal 16 operates substantially between upper operability limit 52 and lower operability limit 54—i.e., less than about 0.05% of read bits are erroneous due to γ fluctuations. This is possible because the rate of adjustment of NC signal 16 is kept sufficiently low that γ is stable. The operability limits 52, 54 define a range of NC values so that partially compensated signal V(t) is sufficiently linear that channel IC 260 can generate accurate digitized system output $D_n$. Note, however, that NC signal 16 passes below the lower operability limit 54 at point 56, signifying an erroneous bit in the system output $D_n$. With modern error correction routines, up to about 4% of the bytes of a data block can be read erroneously and corrected. Thus, several single bit errors are recoverable without re-reading the data block.

NC signal 12, starting at γ=0, converges to the operability range very slowly. The rate of adjustment of NC signal 12, shown in FIG. 3 as the vertical increment 94 divided by the horizontal increment 92, is low enough to maintain an NC signal 16 within the operability range, but too low to allow a very divergent NC signal 12 to reach the operability range until after $n>N_L$, where $N_L$ is the discrete-time operational time limit for the system. The system-imposed time limit $N_L$ will often correspond to the time for reading the maximum number of recoverable data bytes, but may be as short as the time for reading 5 to 10 bytes.

The operability range defined by limits 52, 54 drift downward in FIG. 3, a gradual change within the range of rates that can be tracked by the adaptive nonlinearity compensation rate explained above. Very slow operability range drifts of this kind can be caused by thermal drifts, incremental biasing changes, and similar phenomena, and are adequately addressed by prior art adaptive schemes. Limits 52, 54 are not shown in the less-magnified scale of FIG. 4, but it should be understood that they would be so close to signal 16 as to be indistinguishable from it. The scale of FIG. 4 is sufficiently large, in fact, that the slope of signal 16 is imperceptible.

FIG. 4 removes gaps 83 and 86 so that the convergence of NC signal 12 can be seen as a gradual upward slope. The continuous-time operational time limit $T_L$ (corresponding to $N_L$) occurs long before NC signal 12 reaches the operational limit near operating signal 16. According to the present invention, initial value 8 for NC signal 18 is derived from data stored in a memory device. This data can be programmed into controller microcode, for example, based upon characterization of many read heads similarly manufactured. This derivation can include mathematical manipulations, combinations with other stored or measured data, or direct data transfer from stored form to a nonlinearity compensation system 340. Preferably derived from past measurements using the specific read head to which they pertain, initialization data are retrieved before or during a first read attempt after power-up according to the present invention.

Figure 5:
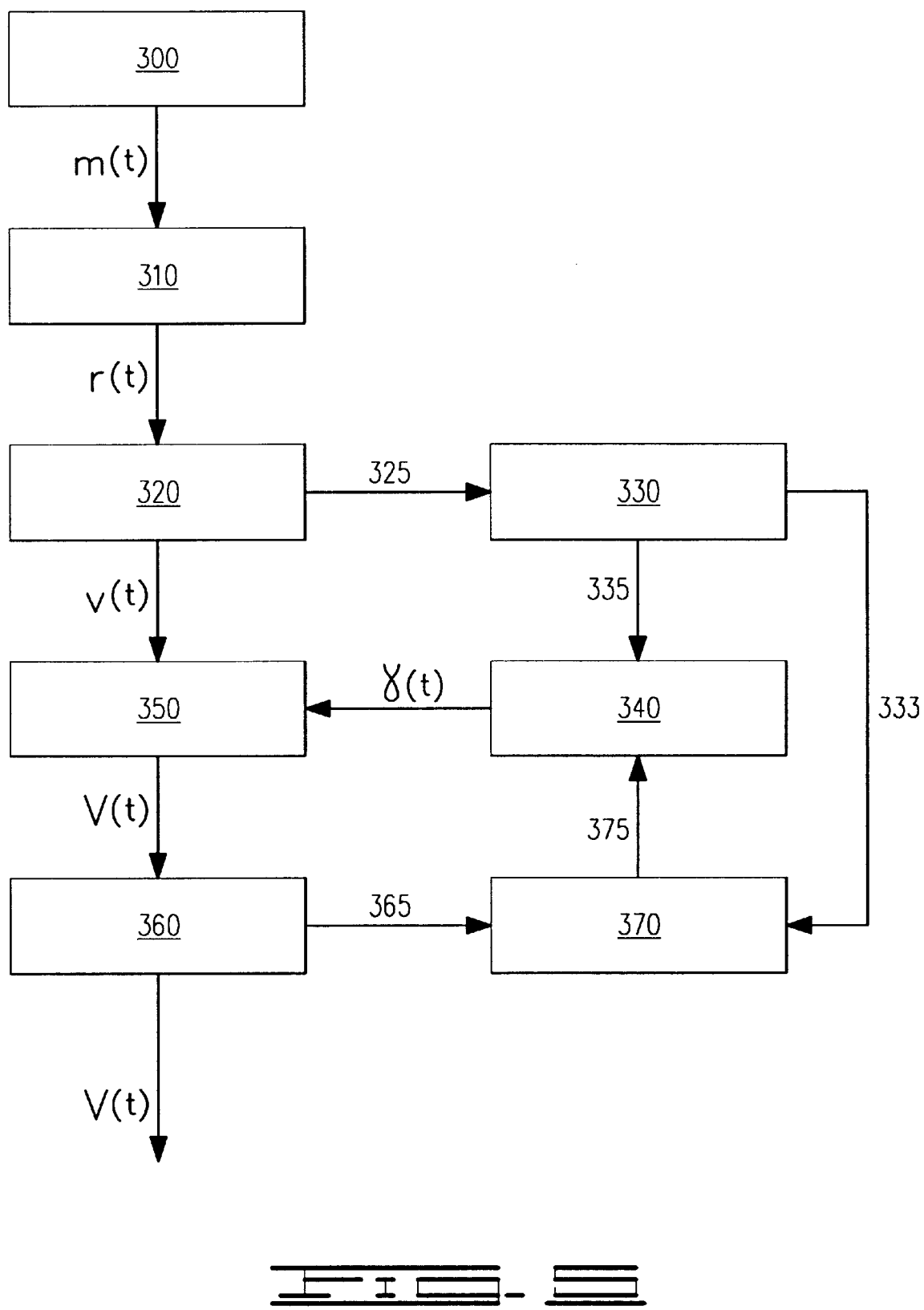
FIG. 5 depicts an improved nonlinearity compensation (NC) feedback system of the present invention.

FIG. 5 depicts an improved nonlinearity compensation (NC) feedback system of the present invention. Disc 300, MR head 310, and preamplifier 320 operate substantially as corresponding elements in FIG. 2, except that event signal 325 notifies controller 330 when an error recovery attempt occurs. Event signal 325 could take any of several forms, including v(t), V(t), or a simple digital pulse. Modulator 350 reduces the nonlinearity of amplified signal v(t) according to the value of compensation signal γ(t), which is preferably two or more analog lines each corresponding to a multiplier of an even-order frequency component of v(t). Channel IC 360 receives compensated signal V(t) and generates linearity error feedback signal 365 according to methods known in the art and exemplified in U.S. Pat. No. 5,744,993. NC adaptation circuit 370 receives linearity error feedback signal 365 and instruction signal 333 and generates rate of adjustment signal 375. Note that rate signal 375 may be a nominal value or a higher-than-nominal amplified value, depending on instruction signal 333. Note also that rate signal 375 may simply define an increment of γ, if a predetermined time increment 92 is used.

Controller 330 signals adaptation circuit 370 to use an amplified rate of adjustment in response to an event signal 325 signifying an error recovery attempt. In this mode, NC system 340 adjusts compensation signal γ(t) at the rate indicated by rate signal 375. In an alternate mode (corresponding to predetermined criteria indicating a loss of confidence in γ(t) being near the operability range, such as power-up), NC system 340 retrieves an initial value of γ(t) via control signal 335. In a preferred embodiment, controller 330 has access to NC range information characteristic of similar read heads, in addition to detailed signature data of the individual read head 310.

Returning to FIG. 4, NC signal 12 represents a slow convergence of an initial read attempt using an adaptive nonlinearity feedback system of the prior art, starting from γ=0. In this example, NC signal 12 does not converge (i.e., to the operability range) within time limit $T_L$, and does not converge within the sector read period (not shown). In a first re-read attempt, re-read NC signal 14 converges further from its end-of-sector value 4. Re-read NC signal 14 also fails to converge within time limit $T_L$, but finally converges near the end of the re-read sector. By that time, far too many of the re-read data bytes are erroneous, and so the first re-read attempt is unsuccessful. The second re-read NC signal 16, starting at second end-of-sector value 6, begins within the operability limits 52, 54 and is successful. It is preferred, however, that a NC compensation signal reliably converge within the time limit $T_L$ of the first attempt to re-read the data block. It is also preferred that vertical increment 94 be kept small without necessitating multiple re-read attempts, so that an NC signal remain stable within the operability range. Note that these concerns, including system stability, are equally valid with respect to analog NC signals.

NC signal 20 compensates for nonlinearity and converges during the first re-read attempt, in accordance with the present invention. Like NC signal 14, NC signal 20 starts from a value obtained in the initial sector read. In a first embodiment, no ranging is employed. NC adaptation circuit 370 (referring again to FIG. 5) derives a nominal rate of adjustment to the compensation signal from the nonlinearity component of V(t) detected by the channel IC 360. Controller 330 detects an error recovery attempt and generates a signal 333 to instruct the NC adaptation circuit 370 to amplify the nominal rate of adjustment. Preferably, this amplification will be a factor greater than two, and more preferably between 5 and 50. At a later time $t_4$, the NC adaptation circuit returns to a rate near or below the nominal rate. This causes NC signal 20 to experience a down-shift "knee" 25, so that the NC signal 20 can thereafter remain stable within the operability range. Because NC signal 20 reaches the operability range within $T_L$ and remains there for the duration of the block read, the re-read block of data is reliably recoverable without a second re-read attempt.

In a second embodiment employing no ranging, controller 330 instructs the NC adaptation circuit 370 to increase the nominal rate of adjustment by a much greater initial factor than that of NC signal 20. In FIG. 4, this much greater rate is depicted as the portion of NC signal 30 before time $t_1$, a steep segment to the left of knee 35. The amplifier employed to modify the NC signal 30 decreases repeatedly at subsequent knees 36 and 37, continuing the rapid convergence while maximizing the chances that the vertical increment 94 will be small enough to re-read reliably. The faster convergence of NC signal 30 is desirable, especially when the operability time limit $T_L$ is not known precisely.

In a third embodiment, controller 330 implements ranging—i.e., modifying NC signal values by more than 10% by direct transfer via control signal 335. Ranging is best suited for cases where confidence in an NC signal's initial value is low. Examples include a head biasing change event, power-up, and several others recognized by those skilled in the art.

Recall that following the unsuccessful initial attempt to read the sector corresponding to NC signal 12, γ(t) had a value 4. To implement ranging, controller 330 uses control signal 335 to instruct NC system 340 to implement ranging increment 10. Increment 10 is preferably derived as a scalar multiplier of value 4 or a value (in units of γ) to be added to γ(t) at the beginning of the re-read cycle. Increment 10 is preferably selected to be slightly smaller than the maximum vertical range allowing convergence within time limit $T_L$. For example, analog NC signal 40 continuously approaches the operability range circumscribing signal 6, and appears to converge within time limit $T_L$, just barely. If the operability range were lower, analog NC signal 40 would converge too slowly. Ranging increment 10 should be reduced (to a factor of about 2 or an additive value of about the magnitude of value 4), if it is to be used with the adjustment rate scheme of analog NC signal 40.

FIG. 6 depicts a flowchart of a method for recovering a block of stored data that has been erroneously read due to improper read head nonlinearity compensation of the present invention. A data block is read 400 using read head 300 and a nonlinearity compensation (NC) signal γ(t). Preferably, NC signal γ(t) is either retrieved from memory (at power up) or retained from prior block reads, and is therefore likely to be near the operability range in typical cases. A central processing unit (CPU) or application-specific integrated circuit (ASIC) performs error correction procedures such as checksum routines known in the art 405. If the CPU or ASIC encounters a relatively small number of erroneous bytes (i.e. less than about 2–4%), the read attempt is deemed successful 405. If there is a read error, a recovery attempt is begun 410 which may include a variety of mechanical steps and/or electrical steps as are known in the art. Examples include those depicted in U.S. Pat. No. 5,754,355 ("Disk Drive Apparatus and Read Error Recover Method in a Disk Drive Apparatus" filed Apr. 17, 1996 by Takashi Nakamura et al.). Optionally, step 410 includes head biasing changes and re-read attempts, including additional error correction query steps. According to the present invention, step 410 may also comprise ranging or other data retrieval from the memory of controller 330, as described in conjunction with FIGS. 4, 7, and 8.

If the block of stored data has been erroneously read due to improper read head nonlinearity compensation, step 410 will be unsuccessful. According to the present invention predetermined nonlinearity correction, kept small to provide stability, is up-shifted (i.e. amplified by a factor of more than 2, and preferably 5–50) for a minority of the block re-read period 420. Note that the block re-read period 420 may include up-shift step 415, and possibly earlier steps, as further explained below in conjunction with FIG. 7.

Down-shift query 422 and wait step 424 form a wait loop, known in the art. Desirably, a CPU uses down-shift criteria selected so that this wait loop is executed repeatedly until the NC signal is likely to be near the operability range. In a more complex embodiment, the CPU monitors sign data $Y_n$ (of the type depicted in FIG. 2, if available), using three sign transitions (suggesting oscillation) as a loop exit criterion. In a simpler embodiment, the CPU counts executions of wait step 424 of a fixed duration, using a fixed count corresponding to about 3% of the block re-read period 420 as a loop exit criterion. In a third embodiment, the CPU exits the loop whenever either of these criteria is met after at least 100 clock cycles of total wait time.

Once a loop exit criterion is met, the nonlinearity correction is down-shifted 426 to a value at or below its nominal value. After the block re-read period 420 is complete and error correction procedures are re-executed, query 430 indicates either a successful re-read (indicating that the initial error was due to improper read head nonlinearity compensation) or a hard error. The present method can be modified, of course, to perform subsequent re-read attempts as described above before deeming the error "hard."

Figure 7:
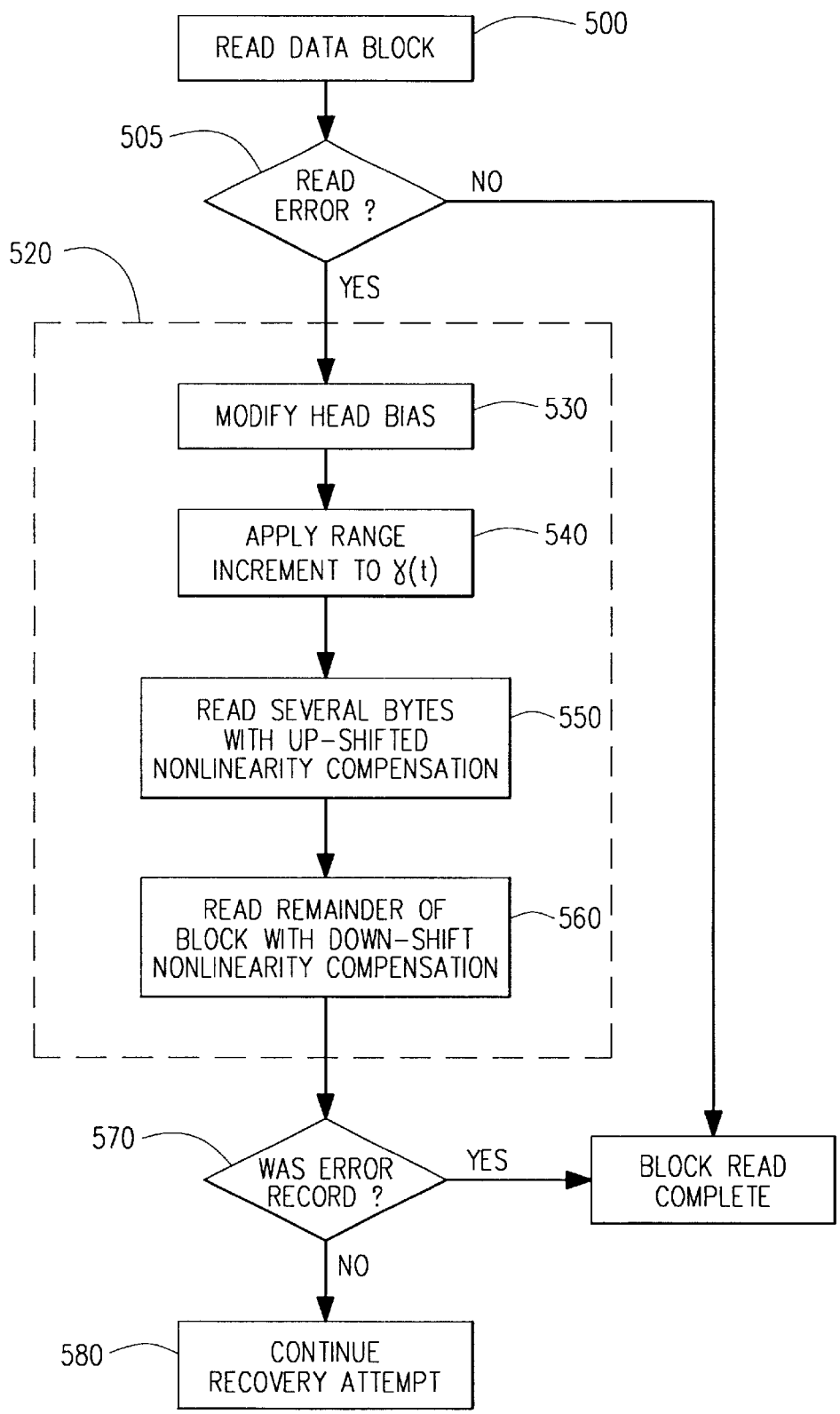
FIG. 7 depicts a method of the present invention featuring simple ranging similar to that explained in conjunction with FIG. 4.

FIG. 7 depicts an embodiment of the present invention featuring simple (i.e., single-increment) ranging similar to that explained in conjunction with FIG. 4. Steps 500 and 505 detect an uncorrectable initial read, and a block re-read period 520 begins. Step 530 modifies the head according to a head bias control scheme such as those known in the art. Rather than wasting the time required to find and re-read a data block for the sole purpose of providing head bias feedback information, this information is acquired (within a few bytes) at the beginning of the block re-read period 520.

After this modification step 530, confidence that γ(t) is within its operability range is low. Knowledge about the nature of the head bias modification, however, may optionally be used to select a suitable range increment according to the present invention. Recall that range increment 10 depicts a multiplier of 2.8 in FIG. 4, a first simple ranging method embodiment.

Suppose that bias modification step 530 is known to consist of reversing the magnetic bias through read head 310. In a second embodiment of simple ranging, a ranging increment of −1.0 (a multiplier) is selected to provide a ranged γ(t) value likely to converge (i.e., to the operative range) before $T_L$.

Suppose that bias modification step 530 is devised to move the read head 310 to a more linear range of operation. In a third embodiment of simple ranging, a ranging increment of 0.6 (a multiplier) is selected to provide a ranged γ(t) value likely to converge before $T_L$.

Figure 8:
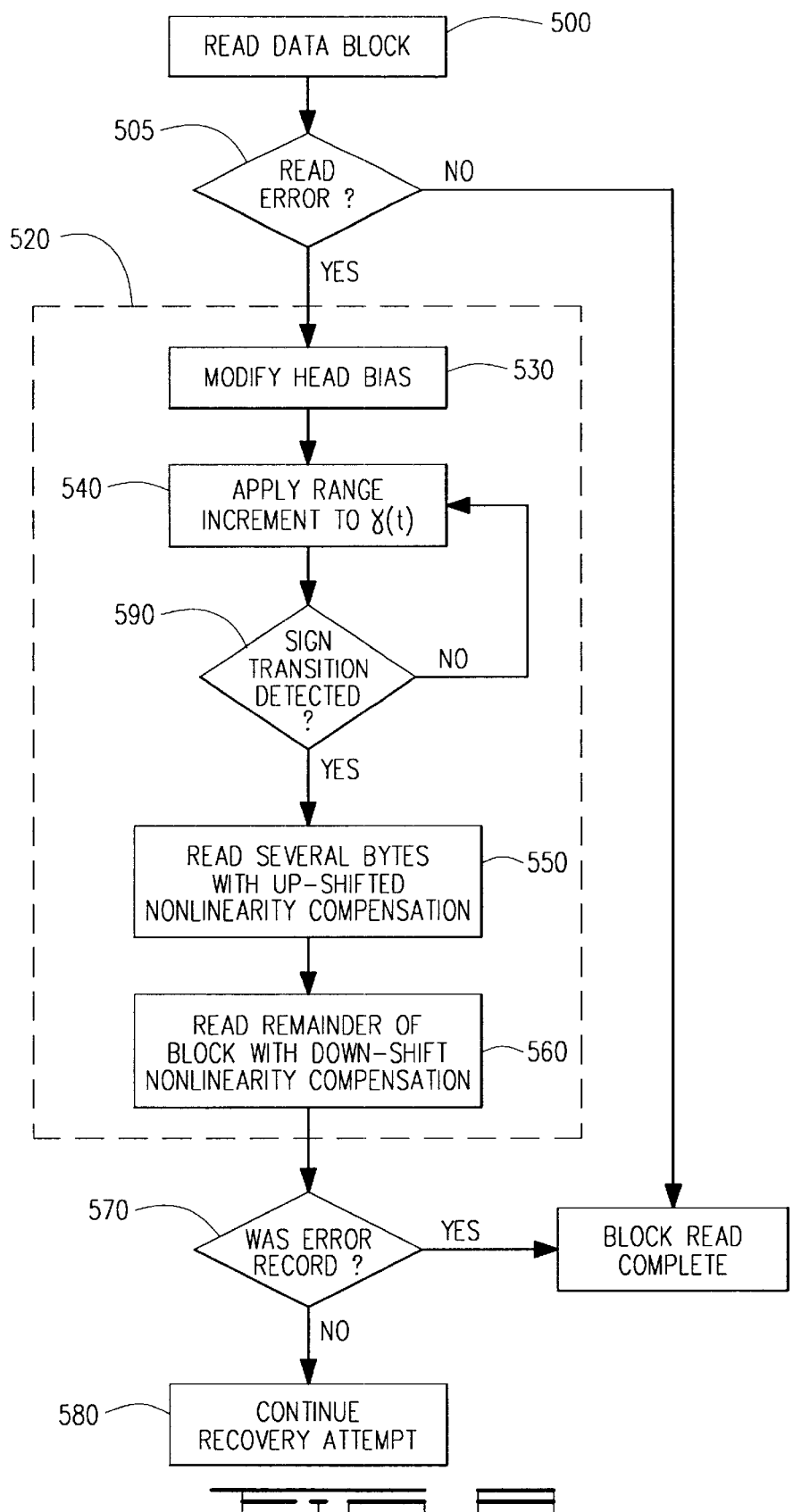
FIG. 8 depicts a modification of FIG. 7 that uses sign data to implement iterative ranging.

FIG. 8 depicts an embodiment of the present invention that uses sign data to implement iterative ranging. FIG. 7 is modified by the addition of query step 590 executed one or more times within a few bytes of modification step 530, so that up-shifted read step 550 can be completed before $T_L$.

Figure 9:
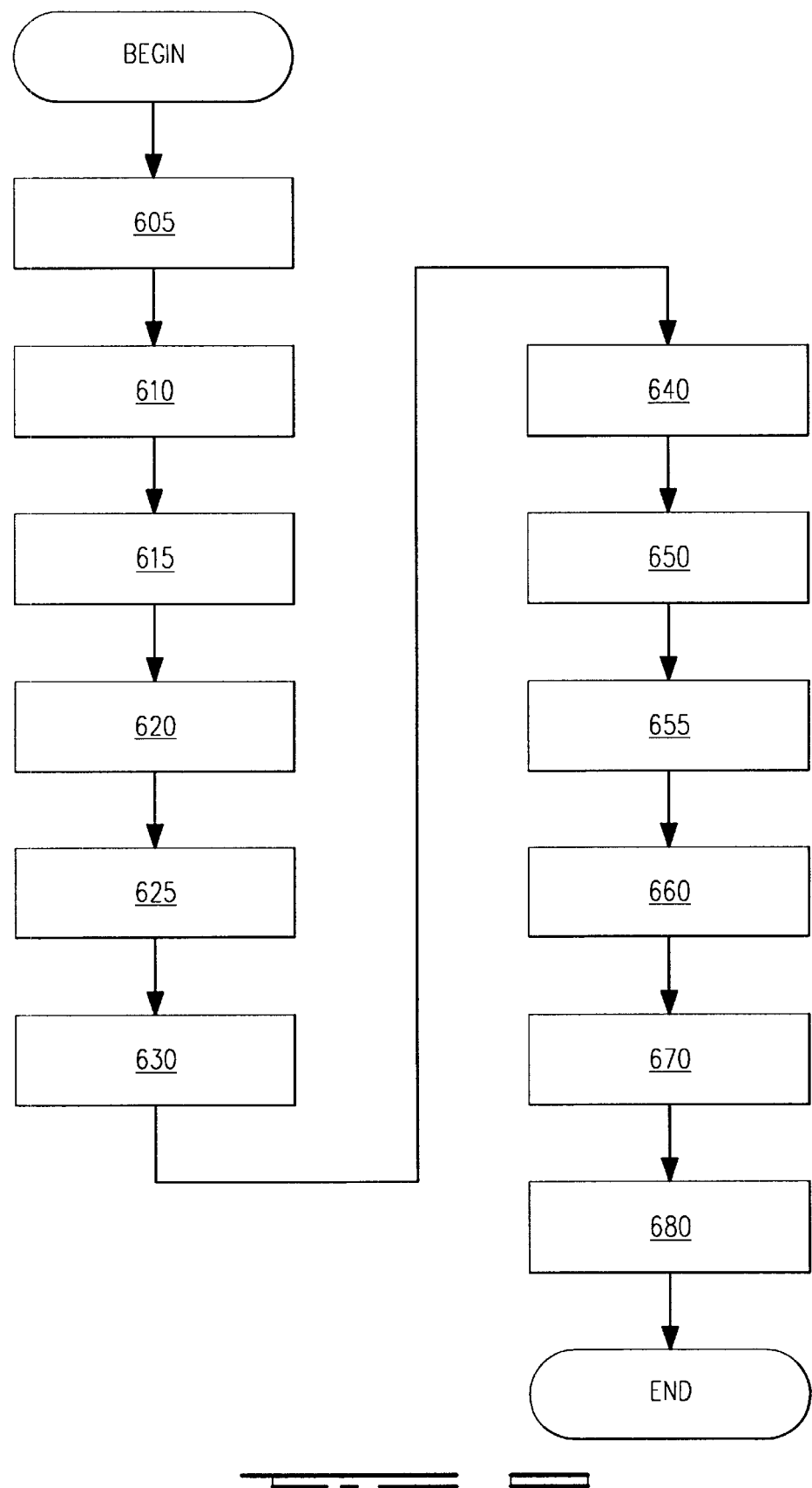
FIG. 9 depicts a flowchart of another method of the present invention.

FIG. 9 depicts a flowchart of another method of the present invention. Step 605 generates an input signal, such as an antenna or a signal from a read head. Step 610 detects a nonlinearity component of the read signal in analog or digital form. Step 615 adds a compensation signal to the read signal to reduce the nonlinearity component of the read signal. Prior to the read step 605, an initial value for compensation signal γ was retrieved from memory to improve the likelihood that the initial read attempt would converge. Step 620 derives a rate of adjustment to the compensation signal from the detected nonlinearity component such as by methods known in the art. Step 625 passes the block of stored data under the read head 310. Step 630 processes the read signal to obtain a first block of read data. Step 640 determines that the first block contains errors not correctable by the system's error correction routines, or not correctable within an acceptable period of time. Step 650 re-reads less than about 4% (i.e. the approximate fraction of correctable errors) of the block of stored data while adjusting the compensation signal at a second rate of adjustment more than twice the derived rate of adjustment. A larger percentage (corresponding to a later time limit) can be used in systems that can correct a larger fraction of erroneous data bytes. Conversely, a smaller percentage must be used in systems that cannot withstand 4% of bytes being erroneous, or that have used up a significant portion of the available time for ranging and other preparatory steps.

The remainder of the block of stored data (i.e. substantially all of the bytes that are input after the first portion is recovered) is read 655 while adjusting the compensation signal at a down-shifted rate of adjustment. The down-shifted rate may be time-varying, but must be kept small enough to maintain γ within its operability range for substantially all of the bytes of the remainder. Except as noted, "substantially all" in this specification means at least about 98%.

Non-correctable errors are detected 660, triggering another block re-read attempt. In the specific embodiment of FIG. 9, a second initial value of the compensation signal is obtained 670 (or otherwise derived by transfer or mathematical manipulation) from data stored in the memory device. A sequence of values to be tried in successive read attempts, for example, may be stored as an array. Step 680 repeats the partial method defined above by steps 605 through 655.

All of the steps and structures described above will be understood to one of ordinary skill in the art, and would enable the practice of the present invention without undue experimentation. It is to be understood that even though numerous characteristics and advantages of various embodiments of the present invention have been set forth in the foregoing description, together with details of the structure and function of various embodiments of the invention, this disclosure is illustrative only. Changes may be made in the details, especially in matters of structure and arrangement of parts within the principles of the present invention to the full extent indicated by the broad general meaning of the terms in which the appended claims are expressed. For example, the particular elements may vary depending on the particular application for the present system while maintaining substantially the same functionality, without departing from the scope and spirit of the present invention. In addition, although the preferred embodiments described herein are directed to nonlinearity compensation schemes for reading magnetic media, it will be appreciated by those skilled in the art that the teachings of the present invention can be applied to other systems without departing from the scope and spirit of the present invention.

What is claimed is:

1. A nonlinearity compensation method for recovering a block of stored data having a first portion and a remainder, the method comprising steps of:
   (a) receiving an input signal representing recovered data from the block of stored data;
   (b) detecting a nonlinearity component of the input signal;
   (c) adding a compensation signal to the input signal to reduce the nonlinearity component of the input signal, the compensation signal having an initial value obtained from data stored in a memory device;
   (d) deriving a rate of adjustment to the compensation signal from the detected nonlinearity component;
   (e) receiving the first portion of the block of stored data while adjusting the compensation signal at a second rate of adjustment more than twice the derived rate of adjustment; and
   (f) receiving substantially all of the remainder of the block of stored data while adjusting the compensation signal at a rate slower than the second rate of adjustment.

2. The method of claim 1, further comprising steps of:
   (g) detecting non-correctable errors in the block of stored data;

(h) deriving a second initial value of the compensation signal from data stored in the memory device; and (i) repeating steps (a) through (f).

3. The method of claim 1 in which the first portion has less than about 4% of the bytes of the block.

4. The method of claim 3 in which the compensation signal has a discrete-time numerical value γ(n) and in which adding step (c) comprises sampling and digitizing the input signal before adding γ(n).

5. The method of claim 3 in which the compensation signal is adjusted at a rate that decreases repeatedly between inputting steps (e) and (f).

6. The method of claim 3 in which the compensation signal is adjusted at a rate that decreases continuously between inputting steps (e) and (f).

7. The method of claim 3 in which inputting step (f) is performed with the compensation signal adjusted at a rate less than about 110% of the derived rate of adjustment.

8. The method of claim 3 in which receiving step (a) receives data from a magneto-resistive element.

9. A system having gear-shifting nonlinearity compensation (NC) for reading a block of stored data having a first portion and a remainder, the system comprising:

(a) a magneto-resistive element positioned to read the data block and produce a read signal;

(b) a preamplifier receiving the read signal and producing an amplified signal;

(c) an NC system providing a compensation signal;

(d) a modulator modulating the amplified signal with the compensation signal and producing a partially-compensated signal;

(e) an integrated circuit receiving the partially-compensated signal and generating digitized data and linearity error feedback;

(f) an NC system adaptation circuit receiving the linearity error feedback and alternately providing a nominal rate of adjustment and an increased rate of adjustment to the compensation signal provided by the NC system; and (g) a control circuit signaling the NC system adaptation circuit to generate the increased rate of adjustment while the element reads the first portion of the data block, and signaling the NC system adaptation circuit to generate the nominal rate of adjustment while the element reads substantially all of the remainder of the data block.

10. The system of claim 9 in which the control circuit comprises a memory device containing magneto-resistive element signature data, the NC system using the signature data to generate an initial value for the compensation signal.

11. The system of claim 9 in which the first portion comprises at least 5 bytes and less than about 4% of the bytes of the block.

12. A nonlinearity compensation system for recovering a block of stored data comprising a first portion and a remainder, the system comprising:

(a) a read circuit for initializing a nonlinearity compensation signal from data stored in a memory, receiving a read signal, representative of the recovered data detecting a nonlinearity component of the read signal, adding a compensation signal to the read signal to reduce the nonlinearity component, and deriving a nominal rate of adjustment to the compensation signal from the detected nonlinearity component;

(b) means for reading the first portion of the block of stored data while adjusting the compensation signal at a second rate of adjustment more than twice the derived rate of adjustment; and (c) means for reading the remainder of the block of stored data while adjusting the compensation signal at third rate of adjustment less than the second rate of adjustment.

13. The system of claim 12 in which the first portion comprises at least 5 bytes and less than about 4% of the bytes of the block.

* * * * *